(12) United States Patent
Lee (10) Patent No.: US 9,608,973 B2
(45) Date of Patent: Mar. 28, 2017

(54) SECURITY MANAGEMENT SYSTEM INCLUDING MULTIPLE RELAY SERVERS AND SECURITY MANAGEMENT METHOD

(71) Applicant: Chung Jong Lee, Seoul (KR)

(72) Inventor: Chung Jong Lee, Seoul (KR)

( * ) Notice: Subject to any disclaimer, the term of this patent is extended or adjusted under 35 U.S.C. 154(b) by 0 days.

(21) Appl. No.: 14/361,247

(22) PCT Filed: Nov. 28, 2012

(86) PCT No.: PCT/KR2012/010188
§ 371 (c)(1),
(2) Date: May 28, 2014

(87) PCT Pub. No.: WO2013/085217
PCT Pub. Date: Jun. 13, 2013

(65) Prior Publication Data
US 2014/0337951 A1    Nov. 13, 2014

(30) Foreign Application Priority Data
Dec. 6, 2011   (KR) .......................... 10-2011-0129438

(51) Int. Cl.
*H04L 29/06*    (2006.01)

(52) U.S. Cl.
CPC .......... *H04L 63/08* (2013.01); *H04L 63/1416* (2013.01)

(58) Field of Classification Search
CPC ......... H04L 29/06; H04L 69/03; H04L 29/00; H04L 12/02; H04L 12/04
(Continued)

(56) References Cited

U.S. PATENT DOCUMENTS 37,258 A * 12/1862 Koren et al. .................. 159/13.1
37,321 A *  1/1863 Oz et al. .......................... 209/23
(Continued)

FOREIGN PATENT DOCUMENTS

CN    101141253 A    3/2008
JP    11-032075 A    2/1999
(Continued)

OTHER PUBLICATIONS

Dick O'Brien, et al. "Intrusion Tolerance Via Network Layer Controls", Proceedings DARPA Information Survivability Conference and Exposition, pp. 1-7 (Jan. 1, 2003). ISBN: 978-0-76-951897-8.

*Primary Examiner* — Dede Zecher
*Assistant Examiner* — Dereena Cattungal
(74) *Attorney, Agent, or Firm* — Novick, Kim & Lee, PLLC; Jae Youn Kim (57) ABSTRACT

The present invention relates to a security management system of a computer network, which includes a center server and two or more relay servers. The relay servers receives at least some of data stored in the center server and stores the received at least some of data. A first relay server stores access authentication information and transmits data requested by the client to the client, when access information received from a client does not match with the access authentication information. The center server transmits a 'block relay' command to the first relay server and a 'start relay' command to a second relay server, when the center server receives information on the malicious access. Accordingly, the second relay server performs a relay function instead of the first relay server.

9 Claims, 4 Drawing Sheets

(58) Field of Classification Search
USPC .............................. 726/4; 380/270; 370/338
See application file for complete search history.

(56) References Cited

U.S. PATENT DOCUMENTS

| | | | | |
|---|---|---|---|---|
| 55,921 | A * | 6/1866 | Narayanswamy et al. ... | 173/323 |
| 169,171 | A * | 10/1875 | Kumar et al. ................ | 298/7 |
| 294,407 | A * | 3/1884 | Owen ........................... | 228/55 |
| 7,342,906 | B1 * | 3/2008 | Calhoun ............ | H04L 63/0892 370/310 |
| 7,594,113 | B2 | 9/2009 | Tan et al. | |
| 7,681,037 | B2 | 3/2010 | Yoshida | |
| 8,457,594 | B2 * | 6/2013 | Stevens et al. .............. | 455/410 |
| 8,713,626 | B2 * | 4/2014 | Cam-Winget et al. ........... | 726/1 |
| 8,898,783 | B2 * | 11/2014 | Chung ................ | H04L 63/1416 726/23 |
| 2004/0243843 | A1 | 12/2004 | Kadobayashi et al. | |
| 2005/0050378 | A1 * | 3/2005 | Liang ..................... | G06F 21/56 714/4.11 |
| 2007/0169171 | A1 * | 7/2007 | Kumar .................. | H04L 63/08 726/2 |
| 2007/0291945 | A1 * | 12/2007 | Chuang ................. | H04L 63/145 380/270 |
| 2007/0298720 | A1 * | 12/2007 | Wolman .............. | H04L 63/1408 455/66.1 |
| 2009/0044265 | A1 | 2/2009 | Ghosh et al. | |
| 2010/0082540 | A1 * | 4/2010 | Isaacson .............. | G06F 11/1458 707/624 |
| 2011/0066841 | A1 * | 3/2011 | Goodrow ............ | H04L 43/0894 713/150 |
| 2014/0053269 | A1 | 2/2014 | Ghosh et al. | |

FOREIGN PATENT DOCUMENTS

| | | |
|---|---|---|
| JP | 2005-065329 A | 3/2005 |
| KR | 10-2004-0028337 A | 4/2004 |
| KR | 10-2004-0079858 A | 9/2004 |
| KR | 10-2005-0050026 A | 5/2005 |
| KR | 10-2011-0024051 A | 3/2011 |
| WO | 03/027858 A1 | 4/2003 |
| WO | 2004-034645 A1 | 4/2004 |

* cited by examiner

SECURITY MANAGEMENT SYSTEM INCLUDING MULTIPLE RELAY SERVERS AND SECURITY MANAGEMENT METHOD

TECHNICAL FIELD

The present invention relates to a security management system and a security management method and more particularly, to a security management system and a security management method for detecting and blocking hacking attempts by using a plurality of mirror servers as relay servers and recovering therefrom.

BACKGROUND ART

Most companies and public institutions construct their own computer networks and perform document transmission or approval between terminals.

As development of communication technologies, working from home or working from outside the office, namely, performing company's work from outside the company, increases. Outside workers access the company's computer network in real time or intermittently from outside the company, download/upload specific documents, or approve specific documents.

Such working from outside the office causes security of the company's computer network to be vulnerable. That is, even though a security system is constructed, malicious accesses by corporate spies or hackers from outside may increase in a state where the company's computer network is open.

In particular, special security management is necessary for the military that treats national security or a nuclear power plant where even a minor malfunction is not allowable. When a hacker intrudes a military computer network, and launches a missile or implants a malicious program to allow important information of the state to be continuously leaked, this is fatal to national defense. On the other hand, situations where savings of customers are unfairly withdrawn occur in the financial companies. This is also caused by lax security management for the computer network.

In order to address these issues, a security management system called as firewall is commonly employed. The firewall system is a hardware and/or software security management system installed to prevent unauthenticated accesses to a computer network. When an external terminal attempts to access a center server, the firewall system provides a communication path allowing only an external device having a pre-registered IP address to access the center server. Some of firewall technologies use packet filtering and the packer filtering determines whether to pass or discard packets on the basis of source and destination IP addresses of the incoming and outgoing packets.

As another solution, there has been endeavored to block malicious access from outside by separating an external network from an internal network and interposing a relay server therebetween.

However, the malicious access is difficult to track down. Even though the malicious access is detected, once the malicious access is performed, a malicious program remains in the relay server and even in the center server. Accordingly, the center server as well as the relay server is required to be replaced or reformatted. This causes loss or damage in important information stored in the center server and results in not only significant expense loss but also a large obstacle to work.

DISCLOSURE OF THE INVENTION

Technical Problem

The present invention has purposes to solve the above-described related art problems by, firstly, fundamentally blocking a hacker from accessing a center server secondly, allowing an intruding hacker not to escape from a computer network and blocking document leaks.

thirdly, when the hacker intrusion is detected, completely removing a remaining risk of a malicious program and strengthening security of the computer network.

Technical Solution

To achieve these purposes, a security management system according to the present invention includes a center server and two or more relay servers.

The relay servers receives at least some of data stored in the center server and stores the received at least some of data.

A first relay server stores access authentication information and transmits data requested by the client to the client, when access information received from a client does not match with the access authentication information.

When access information received from a client does not match with the access authentication information, the first relay server determines an access from the client as a malicious access, blocks the access from the client, and transmits information related to the malicious access to the center server.

The center server transmits a 'block relay' command to the first relay server and a 'start relay' command to a second relay server, and controls the second relay server so as to perform a relay function, when the center server receives information on the malicious access.

The relay server may format a database thereof when the access information does not match with the access authentication information.

The relay server may include a plurality of communication ports connected to the client, and change the plurality of communication ports in a predetermined period or when the access information does not match with the access authentication information.

The access authentication information may include at least one of a login ID, a password, an IP address, a phone number, a client serial number, and an authentication key. The access authentication information may further include access allowance time.

A security management method of a computer network including a center server and a plurality of relay servers, includes: receiving, by a first relay server, access information from a client; searching, by the first relay server, a database and determining whether access authentication information matching with the access information exists; when the access authentication information matching with the access information exists, transmitting data requested by the client to the client, and, when the access authentication information matching with the access information does not exist, blocking the access by the client and transmitting malicious authentication information on the client to the center server; and when receiving the malicious access information, transmitting, by the center server, a 'block relay' command to the first relay server and a 'start relay' command to a second relay server.

The security management method may further include changing a plurality of communication ports, when the access information received from the client does not match with the access valid information, wherein the first relay server comprises the plurality of communication ports.

The security management method may further include formatting a database thereof when the first relay server transmits the malicious access information to the center server.

The access authentication information may include at least one of a login ID, a password, an IP address, a phone number, a client serial number, and an authentication key, and may further include access allowance time.

The security management method may further include changing, by the first relay server, an operation communication port into another communication port after blocking an access by the client, wherein the first relay server includes a plurality of communication ports.

The security management method may further include formatting a database when the first relay server transmits the malicious access information to the center server.

Advantageous Effects

According to the security management system and security management method having the above-described configurations of the present invention, a hacker can be fundamentally blocked from accessing a center server, and important documents can be prevented from being leaked by allowing an intruding hacker not to escape from a computer network. In addition, when the hacker intrusion is detected, a malicious program is not allowed to remain and accordingly security of the computer network can be strengthened.

MODE FOR CARRYING OUT THE INVENTION

Hereinafter, the embodiments of the present invention will now be described in detail with reference to the accompanying drawings.

Figure 1:
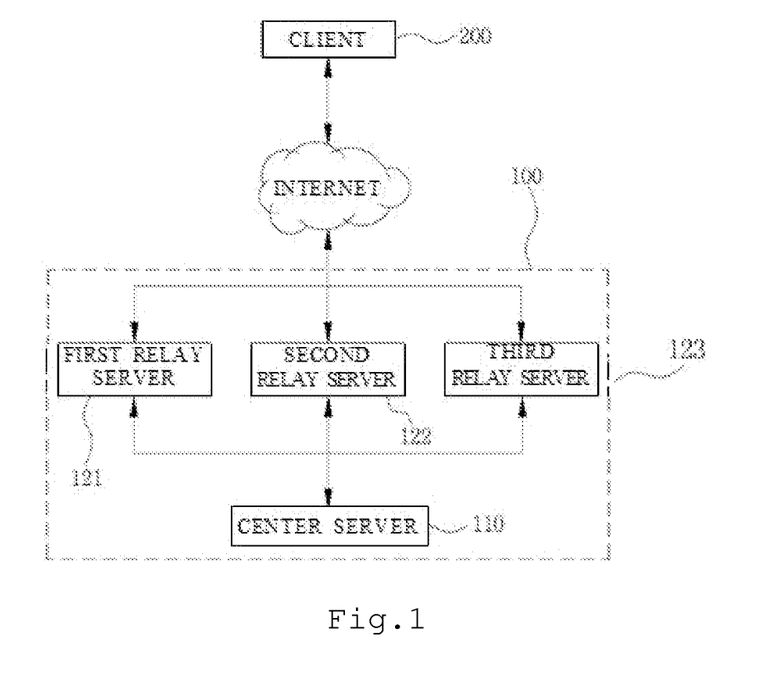
FIG. 1 is a conceptual diagram of a security management system of an in-house computer network including a plurality of relay servers according to the present invention.

FIG. 1 is a conceptual diagram of a security management system of an in-house computer network including a plurality of relay servers according to the present invention.

As shown in FIG. 1, a security management system of an in-house computer network 100 of the present invention includes a center server 110 and a plurality of relay servers 121, 122, and 123.

The center server 110 is a main server of the in-house computer network and provides data etc. to a client 200 over the internet. The center server 110 of the present invention transmits request information to the client 200 via the relay servers 121, 122, and 123.

The security management system of the in-house computer network 100 includes the plurality of relay servers 121, 122, and 123. The relay servers 121, 122, and 123 receive data stored in the center server 110 from the center server 110 and store the received data as 'mirror data' in a database thereof. Here, the 'mirror data' is used as a meaning that the data in the center server 110 is copied to the relay servers 121, 122, and 123 without a change. Surely, the relay servers 121, 122, and 123 do not have to store all the data of the center server 110 and may only store data to be provided to the client 200. For example, information for approval and data to be downloaded/uploaded for work are them. The data to be provided to the client 200 is determined by the center server 110.

The plurality of relay servers 121, 122, and 123 perform identical functions and store identical data under controls of the center server 110. That is, they are configured so that when a first relay server 121 is not functioned, a second relay server 122 is replaced to perform the function. For example, when detecting hacking from outside, the first relay server 121 stops a relay function and transfers the relay function thereof to the second relay server 122 or a third relay server 123. Such a configuration of the relay servers 121, 122, and 123 may be referred to as 'revolving relay server system'.

The relay servers 121, 122, and 123 store access authentication information. The access authentication information includes identification information on a client desiring to access, for example, a login ID, password, IP address, phone number, client serial number, or authentication key, etc. A client may be authenticated with one or more of them.

Besides, when an employee or an executive of a company attempts to perform his/her work, he or she may determine time to access the in-house computer company and perform his/her work. In this case, the access authentication information may further include access allowance time of the client.

The first relay server 121 determines whether access information received from the client 200 is valid. When attempting to access the in-house computer network, the client 200 transmits access information, for example, a login ID, password, or IP address thereof, to the first relay server 121. The access information transmitted to the first relay server 121 may be transmitted to the first relay server 121 by an intended input of a user of client 200 or an automatic function of the client 200.

When receiving the access information from the client 200, the first relay server 121 searches for access authentication information matching with the received access information. If the access authentication information matching with the received access information exists, the first relay server 121 searches for the information requested by the client 200 and transmits the information to the client 200. Otherwise, the first relay server 121 determines the access request from the client 200 as a malicious access and blocks an access from the client 200. At this point, the first relay server 121 transmits the malicious access information related to the malicious access to the center server 110.

In addition, when confirming that the access information does not match with the access authentication information, after transmitting the malicious access information to the center server 110, or when receiving a 'delete data' command from the center server 110, the first relay server 121 may be configured to format its own database. Such a configuration may block malicious codes intruded into the first relay server 121 from moving to the center server 110 and effectively block data stored in the first relay server 121 from being leaked to the outside.

Furthermore, the first relay server 121 includes a plurality of communication ports. In this case, the first relay server 121 may change a communication port in a predetermined period or when confirming that the access information does not match with the access authentication information, which is effective to block the malicious access from the client 200 and data leaks thereby. Such a communication port change may be performed selectively or in parallel with formatting of the first relay server 121 to be described later.

When receiving the malicious access information from the first relay server 121, the center server 110 transmits a 'block relay' command to the first relay server 121. The first relay server 121 received the 'block relay' command stops the relay function. On the other hand, the center server 110 transmits a 'start relay' command to the second relay server 122. The second relay server 122 receiving the 'start relay' command performs relays between the in-house computer network 100 and the client 200 instead of the first relay server 121. At this point, when storing data of the center server 110 as a mirror data type, the second relay server 122 may instantly perform the relay function upon receipt of 'start relay' command. However, when the second relay server 122 does not store the data of the center server 110, the second relay server 122 requests transmission of the 'mirror data' from the center server 110 after receiving the 'start relay' command from the center server 110. At this point, the center server 110 instantly transmits the mirror data to the second relay server 122.

Figure 2:
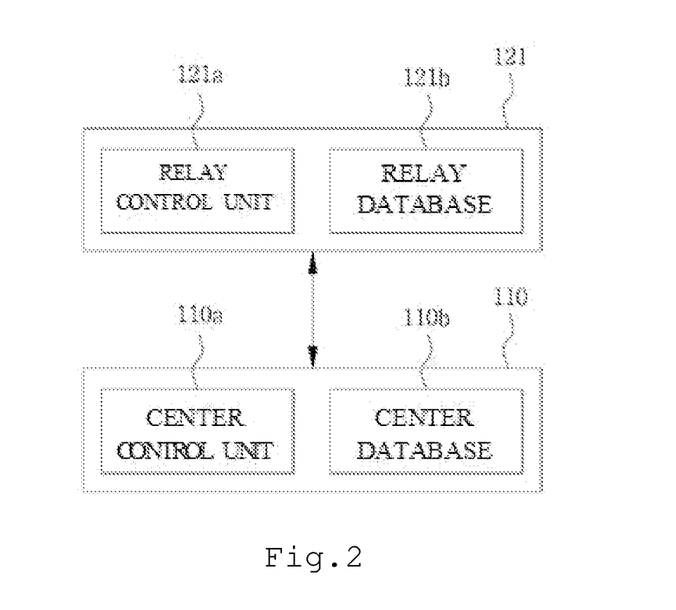
FIG. 2 illustrates exemplary configurations of a center server and a relay server according to the present invention.

FIG. 2 illustrates exemplary configurations of the center server and the relay server according to the present invention.

As shown in FIG. 2, the relay server 121 may include a relay control unit 121a and a relay database 121b.

The relay control unit 121a receives the access information from the client 200, searches the relay database 121b, determines validity of the access information, and performs transmission of the requested data, access blocking, and transmission of the malicious access information.

The relay database 121b stores 'mirror data' received from the center server 110. The mirror data includes information for approval, download/upload information for work, and access authentication information.

On the other hand, the center server 110 may include a center control unit 110a and a center database 110b.

The center control unit 110a transmits the 'mirror data' to the plurality of relay servers 121, 122, and 123. In addition, when receiving the malicious access information from the first relay server 121, the center control unit 110a transmits a 'block relay' command and, in this case, transmits a 'start relay' command to another relay server 122 or 123 and allows the other relay server 122 or 123 to perform the relay function of the first relay server 121. The center database 110b stores information for approval, download/upload information for work, and access authentication information, and additionally, information on the plurality of relay servers 121, 123, and 122 and control information on the plurality of relay servers 121, 122, and 123.

Figure 3:
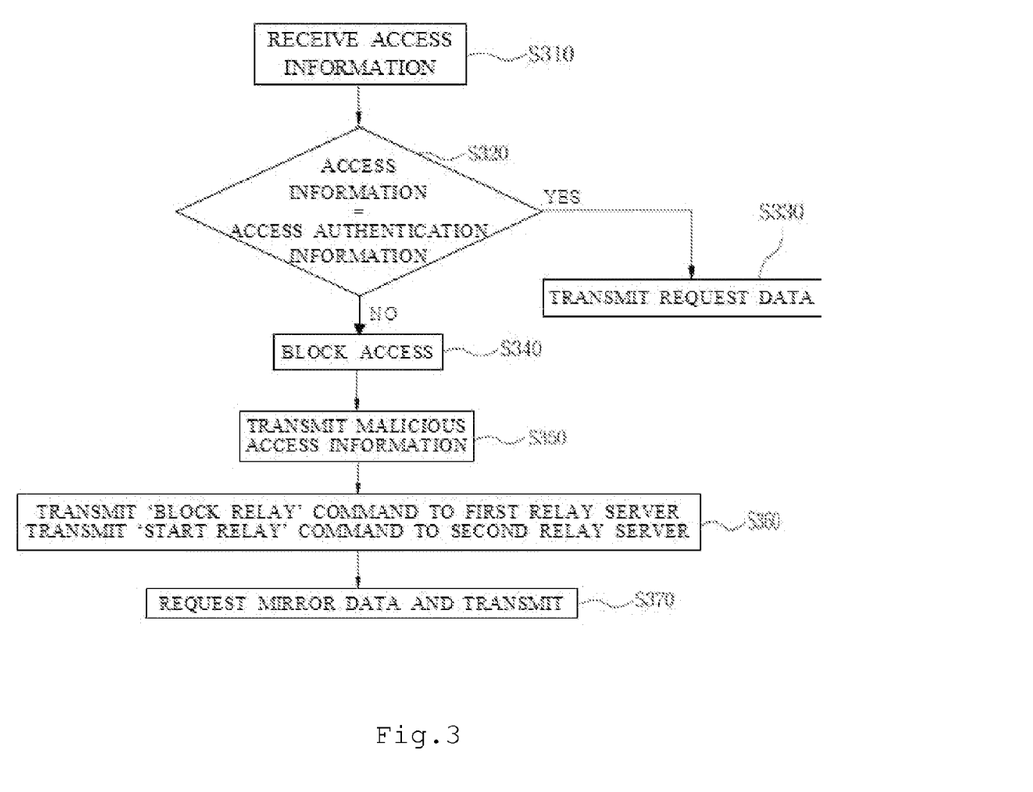
FIG. 3 is a flowchart illustrating a first security method of an in-house computer network including a plurality of relay servers.

FIG. 3 is a flowchart illustrating a first security method of an in-house computer network including a plurality of relay servers.

As shown in FIG. 3, the first relay server receives access information from a client (operation S310). The access information may include a login ID, a password, a client IP, or an address.

The first relay server verifies that the access information received from the client is valid (operation S320). The verification of the client validity is performed by determining whether the received access information matches with access authentication information stored in the database. If matching, the client is verified. Otherwise, the access by the client is determined to be a malicious access. The first relay server receives and updates the access authentication information from the center server in real time or in a predetermined period.

As a result of validity determination, when the client is valid, the first relay server extracts data desired by the client from the database and transmits the data to the client (operation S330). When the client is determined as not being valid and to attempt a malicious access, the first relay server blocks the access by the client (operation S340).

Then, the first relay server transmits the malicious access information related to the malicious access of the client to the center server (operation S350).

The center server receiving the malicious access information from the first relay server transmits a 'block relay' command to the first relay server and a 'start relay' command to the second relay server (operation S360). The first relay server receiving the 'block relay' command closes a relay function thereof, and the second relay server receiving the 'start relay' command replaces the first relay server and performs the relay function.

The second relay server searches the database and determines whether the 'mirror data' exists. When the 'mirror data' does not exist, the second relay server requests the 'mirror data' from the center server. At this point, the center server transmits the 'mirror data' to the second relay server (operation S370).

Figure 4:
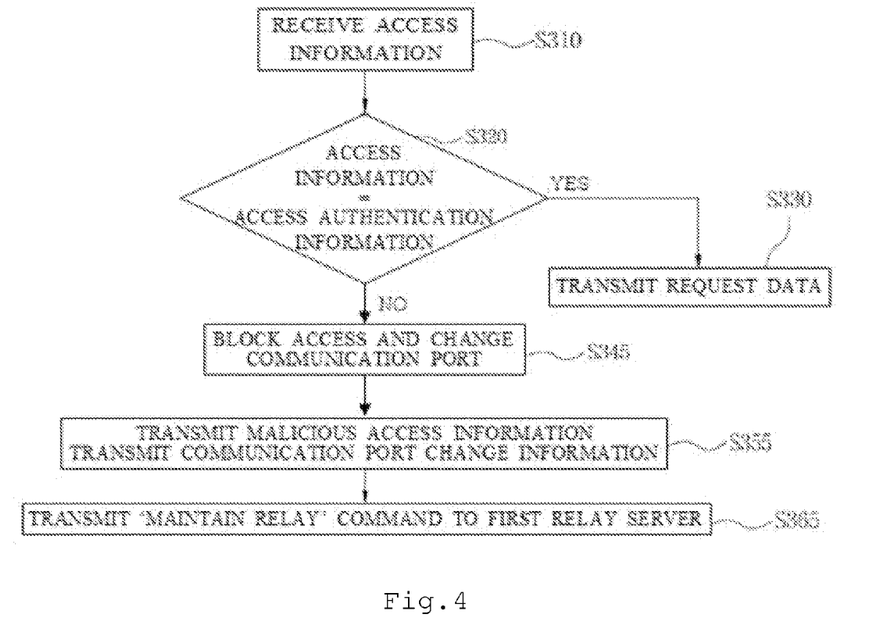
FIG. 4 is a flowchart illustrating a second security method of an in-house computer network including a plurality of relay servers.

FIG. 4 is a flowchart illustrating a second security method of the in-house computer network having the plurality of relay servers.

As shown in FIG. 4, the first relay server receives access information from the client (operation S310).

The first relay server verifies that the access information received from the client is valid (operation S320). When the received access information matches with access authentication information stored in the database, the first relay server authenticates the client and transmits the requested information to the client (operation S330). When the received access information does not match with access authentication information, the access by the client is determined as a malicious access, and the access by the client is blocked. In addition, the first relay server changes a communication port connected to the client (operation S345).

The first relay server transmits the malicious access information related to the malicious access by the client to the center server. At this point, the first relay server may transmit information related to the port change together (operation S355).

The center server receiving the malicious access information from the first relay server typically transmits a 'block relay' command to the first relay. However, when receiving together with the port change information, the center server may transmit a 'maintain relay' command to the first relay server. In this case, the first relay server maintains the relay function with the port thereof being changed (operation S365).

When the center server transmits the 'block relay' command to the first relay server and the 'start relay' commands to the second relay server, the first relay server receiving the 'block relay' command closes the relay function and the second relay server receiving the 'start relay' command performs the relay function instead of the first relay server. In this case, the center server transmits the 'mirror data' to the second relay server when receiving a request by the second relay server.

Figure 5:
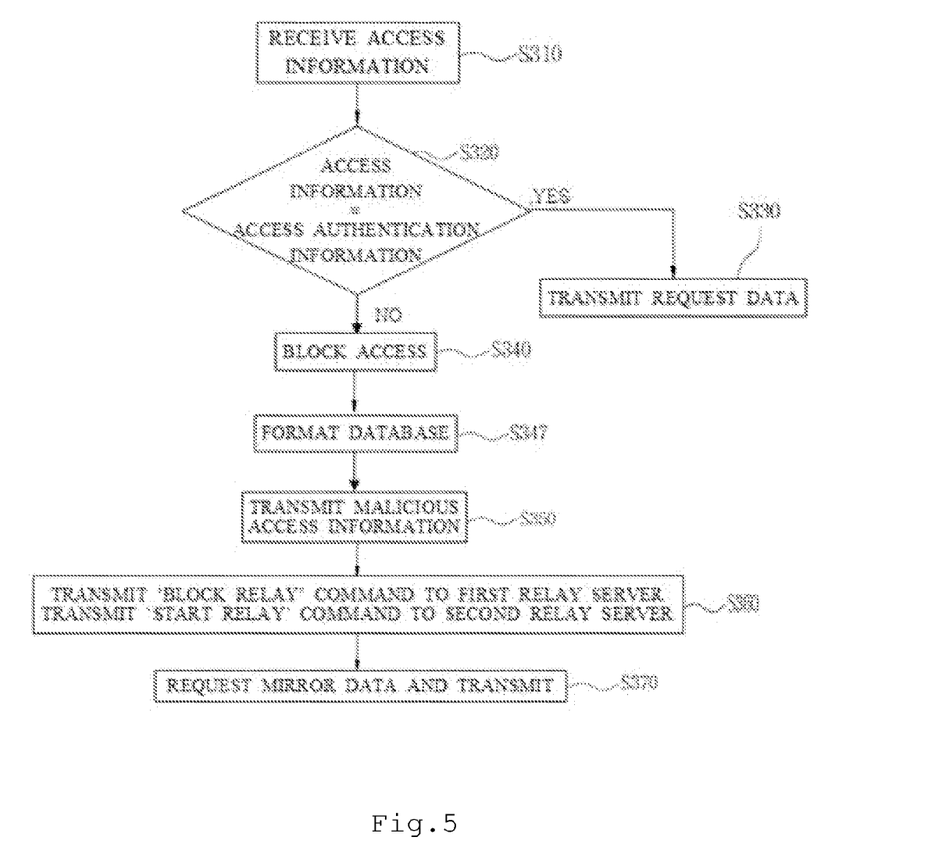
FIG. 5 is a flowchart illustrating a third security method of an in-house computer network including a plurality of relay servers.

FIG. 5 is a flowchart illustrating a third security method of the in-house computer network including a plurality of relay servers.

As shown in FIG. 5, after receiving access information from the client, the first relay server verifies that the access information is valid (operation S320). When the access information matches with access authentication information, the first relay server transmits information requested by the client to the client (operation S330). When the access information does not match with access authentication information, the first relay server determines the access by the client as a malicious access and blocks the access by the client (operation S340).

At this point, the first relay server may format its own database according to a program thereof (operation S347).

The first relay server transmits the malicious access information to the center server (operation S350). Here, operation S347 and operation S350 may be performed in reverse order.

The center server receiving the malicious access information from the first relay server transmits a 'block relay' command to the first relay server. At the same time, the center server may transmit a 'format database' command to the first relay server. In this case, the first relay server formats its own database.

When the center server transmits a 'start relay' command to the second relay server while transmitting 'block relay' command to the first relay server, the first relay server receiving the 'block relay' command closes the relay function and the second relay server receiving the 'start relay' command performs the relay function instead of the first relay server (operation S360). In this case, the center server transmits 'mirror data' to the second relay server, when receiving a request from the second relay server (operation S370).

In operation S360, when receiving a 'format database' command from the first relay server, the center server may transmit 'maintain relay' command to the first relay server.

Although embodiments have been described with reference to a number of illustrative embodiments thereof, it should be understood that numerous other modifications and embodiments can be devised by those skilled in the art that will fall within the spirit and scope of the principles of this disclosure. Therefore, the scope of the invention is defined by the appended claims, and various variations and modifications within the scope will be construed as being included in the present invention.

DESCRIPTION OF REFERENCE NUMERALS

100: in-house computer network 110: center server
121, 122, 123: relay server 200: client
110a: relay control unit 110b: relay database
121a: relay control unit 121b: relay database

The invention claimed is:

1. A security management system, comprising:
a center server; and
a plurality of relay servers receiving at least one datum of data stored in the center server and storing the received at least one datum,
wherein each of the plurality of relay servers comprises a relay control unit and a relay database, and the center server comprises a center control unit and a center database,
and the center server is configured to transmit requested information to a client via at least one of the plurality of relay servers, and
wherein a first relay server of the plurality of relay servers stores access authentication information transmitted from the center database to the relay database, transmits data requested by the client to the client when access information received from the client matches with the access authentication information, and,
when the access information received from the client does not match with the access authentication information, the first relay server determines an access from the client as a malicious access, blocks the access from the client, formats the relay database and transmits information related to the malicious access to the center server,
and, when the center server receives information on the malicious access, the center server transmits a 'block relay' command instructing the first relay server to stop a relay function to the first relay server and a 'start relay' command instructing a second relay server of the plurality of relay servers to perform the relay function to the second relay server, and controls the second relay server so as to perform the relay function.

2. A security management system, comprising:
a center server; and
a plurality of relay servers receiving at least one datum of data stored in the center server and storing the received at least one datum,
wherein each of the plurality of relay servers comprises a relay control unit and a relay database, and the center server comprises a center control unit and a center database,
and the center server is configured to transmit requested information to a client via at least one of the plurality of relay servers, and
wherein a first relay server of the plurality of relay servers stores access authentication information transmitted from the center database to the relay database, transmits data requested by the client to the client when access information received from the client matches with the access authentication information,
and, when the access information received from the client does not match with the access authentication information, the first relay server determines an access from the client as a malicious access, blocks the access from the client, and transmits information related to the malicious access to the center server,
and, when the center server receives information on the malicious access, the center server transmits a 'block relay' command instructing the first relay server to stop a relay function to the first relay server and a 'start relay' command instructing a second relay server of the plurality of relay servers to perform the relay function to the second relay server, and controls the second relay server so as to perform the relay function, and
wherein the first relay server comprises a plurality of communication ports connected to the client, and changes a port being used to another of the plurality of communication ports in a predetermined period or when the access information does not match with the access authentication information.

3. The security management system of claim 2, wherein the access authentication information comprises at least one of a login ID, a password, an IP address, a phone number, a client serial number, and an authentication key.

4. The security management system of claim 3, wherein the access authentication information further comprises an access allowance time.

5. A security management method of a computer network comprising a center server comprising a center control unit and a center database, and a plurality of relay servers, each of the plurality of relay servers comprising a relay control unit and a relay database, the method comprising:
   receiving, by a first relay server of the plurality of relay servers, access information from a client;
   searching, by the first relay server, the relay database and determining whether access authentication information transmitted from the center database and stored in the relay database matches with the access information;
   when the access authentication information matches with the access information, transmitting, by the first relay server, data requested by the client to the client;
   when the access authentication information does not match with the access information, blocking the access by the client, formats the relay database and transmitting malicious authentication information on the client to the center server; and,
   when receiving the malicious access information, transmitting, by the center server, a 'block relay' command instructing the first relay server to stop a relay function to the first relay server and a 'start relay' command instructing a second relay server of the plurality of relay servers to perform the relay function to the second relay server.

6. The security management method of claim 5, wherein the first relay server comprises a plurality of communication ports, the method further comprising changing, by the first relay server, a port being used to another of the plurality of communication ports, when the access information received from the client does not match with the access authentication information.

7. The security management method of claim 5, wherein the access authentication information comprises at least one of a login ID, a password, an IP address, a phone number, a client serial number, and an authentication key.

8. The security management method of claim 7, wherein the access authentication information further comprises an access allowance time.

9. The security management system of claim 1, wherein the first relay server comprises a plurality of communication ports connected to the client, and changes a port being used to another of the plurality of communication ports in a predetermined period or when the access information does not match with the access authentication information.

* * * * *